United States Patent [19]

Miyatake et al.

[11] Patent Number: 4,943,154
[45] Date of Patent: Jul. 24, 1990

[54] PROJECTION DISPLAY APPARATUS

[75] Inventors: Yoshito Miyatake; Yoshihiro Masumoto, both of Neyagawa, Japan

[73] Assignee: Matsushita Electric Industrial Co., Ltd., Osaka, Japan

[21] Appl. No.: 314,071

[22] Filed: Feb. 23, 1989

[30] Foreign Application Priority Data

| Feb. 25, 1988 | [JP] | Japan | 63-42665 |
| Mar. 8, 1988 | [JP] | Japan | 63-54234 |
| Mar. 24, 1988 | [JP] | Japan | 63-70035 |
| Mar. 24, 1988 | [JP] | Japan | 63-70036 |

[51] Int. Cl.$^5$ .............................. G03B 21/00
[52] U.S. Cl. ................................. 353/31; 358/60; 350/174; 353/34
[58] Field of Search ............... 353/30, 31, 34, 37, 353/121, 122, 81, 84, 98, 99; 350/331 R, 332, 169-174; 358/60-62, 55, 64

[56] References Cited

U.S. PATENT DOCUMENTS 2,642,487 2/1947 Schroeder .
2,958,258 11/1960 Kelly ............................ 368/61 X

FOREIGN PATENT DOCUMENTS 62-237485 10/1987 Japan .
62-258491 11/1987 Japan .
0037316  2/1988 Japan ............................. 353/31

OTHER PUBLICATIONS

Morozumi et al., LCD Full Color Video Projects, SID Digest 1986, p. 375.
Ledebuhr, Full Color Single-Projection Lens, etc., SID Digest 1986, p. 379.
Aruga et al., High Resolution Full Color Video Projector, etc., SID Digest 1987, p. 75.

Primary Examiner—Harry N. Haroian
Attorney, Agent, or Firm—Wenderoth, Lind & Ponack

[57] ABSTRACT

A projection display apparatus has a light source, a component color separator, a light transmitter(s), three light valves, a light combiner, a single projection lens, and a drive circuit. The light transmitter includes an input side convergent lens for producing a real image of a luminous element in the light source at a location adjacent to a central convergent lens. The central convergent lens produces a real image of an object situated about a position of the input side convergent lens at a location adjacent to an output side convergent lens. The output side convergent lens permits its output light to reach the projection lens. Accordingly, divergent light is converged along a considerably extending portion of the optical path and directed to the projection lens so that the efficiency of light in use can be improved, thus allowing the projection display apparatus to remain compact in size and provide a great light output power.

67 Claims, 11 Drawing Sheets

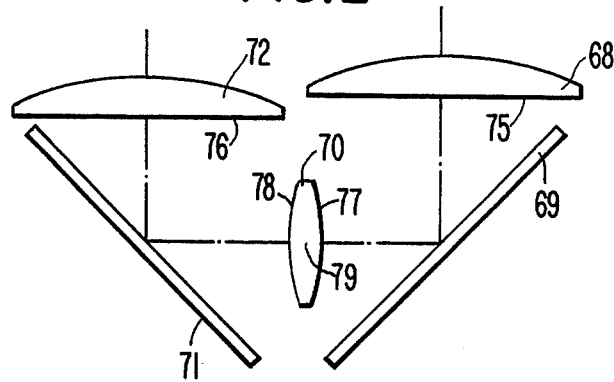
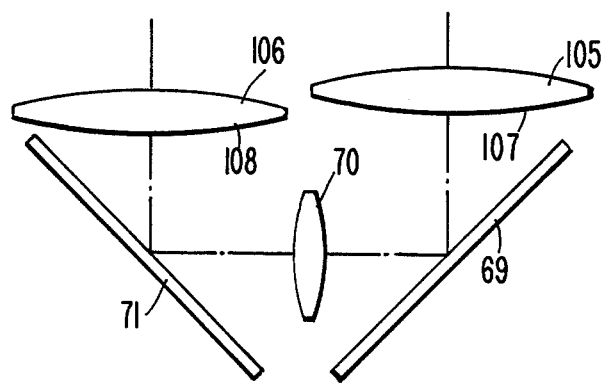

PROJECTION DISPLAY APPARATUS

BACKGROUND OF THE INVENTION

1. Field of the Invention

The present invention relates to a projection display apparatus for projecting by rays of light an optical image of a picture produced in a light valve onto a screen with a projection lens to obtain an enlargement of the picture.

2. Description of the Prior Art

It is well known to modulate light with a relatively small-sized light valve which has produced therein an optical image of a picture according to a video signal and project an enlarged image of the picture with a projection lens onto a screen for display of an enlarged picture. According to such a projection display apparatus, the resolution of the projected picture largely depends on the resolution of the light valve and a high-intensity light source enables to provide a greater output of light. Thus, the projection display apparatus employing a light valve of high resolution can provide a picture of high brightness and high resolution although a display area of the light valve is rather small. Also, a liquid crystal panel is successfully used as a light valve nowadays. For instance, a method of providing a color projected picture with the use of three liquid crystal panels is described in the report "LCD full-color video projector" by Morizumi et al. on Page 375 of SID 86 Digest (1986). The fundamental arrangement of the optical system of Morizumi et al. is shown in FIG. 11.

As shown in FIG. 11, a lamp 1 radiates a light ray having three primary colors of red, green and blue. The radiant light ray from lamp 1 is converted to a parallel ray by a condenser lens 2 and a concave mirror 3, passes through a heat absorbing filter 4, and enters a component color separator 5. The component color separator 5 includes a flat-plate type red-reflecting dichroic mirror 6 and a couple of flat-plate type half-separated blue-reflecting dichroic mirrors 7 and 8 which are arranged at right angles so as to form an X shape. The dichroic mirror surfaces 9 and 10 of their respective mirrors 7 and 8 are on a same plane. Light transmitted to the component color separator 5 is then separated into three colors of red, green and blue. Red color light is reflected by plane mirrors 11 and 12 to enter a red color liquid crystal panel 15. Green color light is straightly transmitted to a green color liquid crystal panel 16. Blue color light is reflected by plane mirrors 13 and 14 to enter a blue color liquid crystal panel 17. The liquid crystal panels 15, 16 and 17 produce optical images in red, green and blue colors respectively as variations in the transmittance of light according to a video signal. The light outputs from the liquid crystal panels 15, 16 and 17 are transformed by a light combiner 18 into a composite light flux to provide a color picture substantially developed at the position of the green color liquid crystal panel 16. An enlarged image of the color picture is then projected with a projection lens 19 onto a screen 20. The light combiner 18 is a prism type dichroic mirror comprising four rectangular prisms 21, 22, 23 and 24 which are all joined together at joint surfaces 25 and 26 both coated with red reflecting dichroic multi-layer films and at joint surfaces 27 and 28 both coated with blue reflecting dichroic multi-layer films so that their respective red and blue reflecting dichroic surfaces can intersect each other at right angles to form an X shape in cross section.

The optical arrangement shown in FIG. 11 has a feature that each of the component color separator 5 and the light combiner 18 comprises dichroic mirrors provided in X-shaped arrangement. Such an arrangement in which a pair of dichroic mirrors are provided in X-shaped arrangement for a component color separator system or a light combiner system, is disclosed in U.S. Pat. No. 2,642,487, "Component color separator", to Schroder.

Another projection display apparatus incorporating an optical arrangement as shown in FIG. 12 is described in the article of "High-resolution full-color video projector with poly-Si TFT array light valves" by Aruga et al., on Page 75, SID 87 Digest (1987). This apparatus has a component color separator different in arrangement from that of FIG. 11.

As shown in FIG. 12, a component color separator 30 includes a flat-plate type blue reflecting dichroic mirror 31 and a flat-plate type green reflecting dichroic mirror 32 which are arranged in parallel to each other. The dichroic mirror surfaces 33 and 34 of their respective mirrors 31 and 32 are positioned such that their respective normal lines 35 and 36 are arranged at angles of 45 degrees to the optical axis 37 of a condenser lens 2. As light enters the component color separator 30, blue light is reflected by the blue reflecting dichroic mirror 31 and then by a plane mirror 38 to enter a blue liquid crystal panel 17. Simultaneously, green color light is reflected by the green reflecting dichroic mirror 32 and then directed to a green liquid crystal panel 16. Red color light transmitted by dichroic mirrors 31 and 32 is reflected by plane mirrors 39 and 40 to enter a red liquid crystal panel 15.

Each of the projection display apparatuses shown in FIGS. 11 and 12 includes a single projection lens so as to easily change the size of a projected picture or the distance between the projection lens 19 and the screen 20. Also, the light combiner 18 has the X-shaped arrangement of the dichroic mirror surfaces, thus permitting space saving in the optical system.

In either of the arrangements shown in FIGS. 11 and 12, the lengths of the optical paths of the three distinct colors from the condenser lens 2 to the respective liquid crystal panels 15, 16 and 17 are not the same. Particularly as shown in FIG. 11, the optical path of the green light is shorter than the optical paths of the red and blue lights. In FIG. 12 the optical paths of the blue and green lights are each shorter than the optical path of the red light. Generally, a light transmitted from the condenser lens 2 will diffuse more as its optical path extends further. This results in a low efficiency in the use of light of a particular color having a long optical path. For white balance in the projected picture, a ratio of the illumination between red, green and blue colors should e kept optimum, e.g. by inserting an attenuation filter into an optical path of a light of a certain color. The optical efficiency of the entire system depends on : color light lacking in illuminance to satisfy the optimum illuminance ratio between red, green and blue colors. Accordingly, both the arrangements shown in FIGS. 11 and 12 have a disadvantage that the efficiency of light n action is low and thus, the output light power will be small.

For the purpose of solving such a problem, there has been proposed by Sonehara a method employing a light guide which has a mirror surface on the inner surface thereof and is arranged along a longer optical path for restricting the diffusion of light by reflection by the mirror surface, as shown in Japanese Unexamined Patent Publication No. 62-237485 (1987). However, improvement in the optical efficiency is made at the peripheral area of a projected picture but not at the central area.

Another method of improving the optical efficiency is developed by Ono in which the diffusion of light is prevented along a longer optical path by converging light rays with a single condenser lens disposed just in the rear of a component color separator. This arrangement still has a disadvantage that a projected picture is less bright in the peripheral area than in the central area.

Furthermore, another projection display apparatus has been proposed by Ledebuhr in which three reflection type liquid crystal light valves are employed for developing a color picture, as described in the report of "Full-color single-projection-lens liquid crystal light-valve projector", on Page 379 of SID 86 (1986). The apparatus includes a 1:1 magnification telecentric relay lens system arranged along a longer optical path so that a surplus length of the optical path can be eliminated equivalently. This relay lens system will be effective with rays of incident light parallel to the optical axis. However, light rays other than the parallel light rays are shaded by an aperture disposed across the optical path or, even if transmitted through the aperture, the rays can hardly be projected from an output side relay lens effectively. Accordingly, the relay lens system is not much suitable for improvement of the optical efficiency although applicable to the diffusion of light.

As set forth above, the conventional projection display apparatus allows a light having a long optical path among red, green and blue lights to diffuse as it runs along the optical path, thus providing a less efficiency in the use of light. In each prior art method of improving the optical efficiency for prevention of a reduction in light energy, the optical efficiency cannot substantially be improved throughout the area of a projected picture and thus, a problem arises that there is a difference in brightness between the central and peripheral areas of the picture. It is understood that the greater the power of the light source is made, the more the light energy can be increased. This however causes the apparatus to become large in size and power consumption.

SUMMARY OF THE INVENTION

The present invention is directed in view of the above respects towards a projection display apparatus adapted to improve efficiency in the use of light in an optical system and yet, to remain compact in size and provide a great light output power.

To achieve the above object, a projection display apparatus according to the present invention comprises a light source for generating a light containing three primary colors, component color separator means for separating the output light from the light source into three primary color lights, three light valves having formed therein optical images for modulating the three primary color lights separated by the component color separator means respectively, a drive circuit for driving the three light valves in response to a video signal to form the optical images, light combiner means for combining the modulated lights from the three light valves into a composite light, a projection lens for projecting the composite light onto a screen to obtain an enlargement of the optical images, and light transmission means disposed across an optical path having a distance from the component color separator means to a corresponding light valve larger than two times an width of an effective flux of light entering the light valve for guiding a light output from the component color separator means to the corresponding light valve. The light transmission means comprises an input side convergent lens disposed at an input end, an output side convergent lens disposed at an output end, and a central convergent lens disposed across an optical path between the input side and output side convergent lenses. The input side convergent lens produces a real image of a luminous element in the light source at a location adjacent to the central convergent lens. The central convergent lens produces a real image of an object adjacent to the input side convergent lens at a location adjacent to the output side convergent lens. The output side convergent lens is arranged to direct its light output to the projection lens.

Preferably, the component color separator has at least two dichroic mirror surfaces thereof.

More preferably, the component color separator is provided with dichroic mirror surfaces intersecting in X-shaped arrangement.

According to a preferred arrangement, the component color separator is provided with two dichroic mirror surfaces intersecting so as to form an X shape for color separation and incorporates a couple of light transmitter for directing two color rays reflected by the component color separator to their respective two light valves. The light transmitter has an input side plane mirror for bending an optical path between the input side and central convergent lenses and an output side plane mirror for bending an optical path between the central and out side convergent lenses. Thus, light passing across the component color separator is transmitted through the light combiner and received by the projection lens.

According to another preferred arrangement, the component color separator is provided with a first dichroic mirror surface for receiving light from the light source and a second dichroic mirror surface for receiving a light without a first particular color separated by the first dichroic mirror surface, the two dichroic mirror surfaces being arranged in approximately parallel to each other. A plane mirror directs a ray of the first color light separated by the first dichroic mirror surface to a corresponding light valve. A light transmitter directs a ray of third color light transmitted through the second dichroic mirror surface to a corresponding light valve. The light transmitter includes an input side plane mirror for bending an optical path between the input side and central convergent lenses and an output side plane mirror for bending an optical path between the central and output side convergent lenses. Thus, light of the second color reflected by the second dichroic mirror surface is straightly transmitted through the light combiner and received by the projection lens.

In such an arrangement, a real image of a luminous element in the light source is formed by both the condenser lens and the input side convergent lens in the light transmitter at a location adjacent to the central convergent lens and then, a real image of an object adjacent to the input side convergent lens is formed by the central convergent lens at a location adjacent to the output side convergent lens. Thus, light from the input side convergent lens to the central convergent lens is completely transmitted through the output side convergent lens without any losses. More specifically, divergeable light is transformed into a convergent light flux by both the input side and central convergent lenses. Accordingly, as the light transmitter means is placed along a longer optical path, a decline in the optical efficiency due to the diverge of light is avoided and the efficiency of light in action will be improved. As a result, it will be possible in practice to provide a projection display apparatus kept compact in size and capable of generating a large light output power. Other novel features and advantages of the present invention will be apparent from the description of preferred embodiments with reference to the drawings.

BRIEF DESCRIPTION OF THE DRAWINGS

FIG. 2 is a schematic view showing the first arrangement of a light transmitter according to the present invention;

FIG. 7 is a schematic view showing the second arrangement of a light transmitter according to the present invention;

DESCRIPTION OF THE PREFERRED EMBODIMENTS

Figure 1:
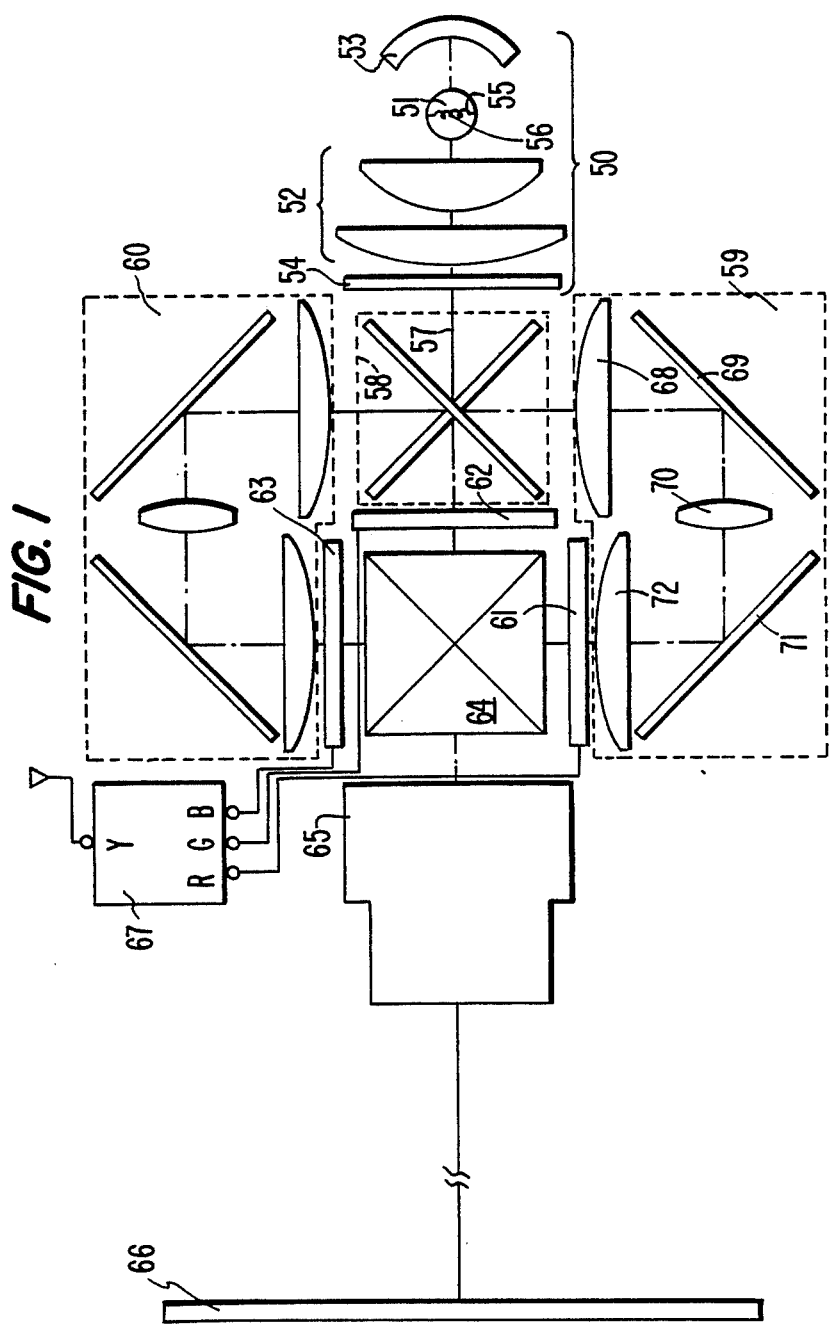
FIG. 1 is a schematic view showing an arrangement of a projection display apparatus according to a first embodiment of the present invention.

FIG. 1 shows an arrangement of an optical system according to a first embodiment of the present invention. The optical system comprises a light source 50, a component color separator 58, light transmitters 59 and 60, light valves 61, 62 and 63, a light combiner 64, a projection lens 65, a drive circuit 67, an input side convergent lens 68, an input side plane mirror 69, a central convergent lens 70, an output side plane mirror 71, and an output side convergent lens 72. The light source 50 comprises a lamp 51, a condenser lens 52, a concave mirror 53, and a heat absorbing filter 54. The lamp 51 radiates a light containing three primary colors of red, green and blue. Rays of the radiant light from the lamp 51 are arranged in approximately parallel rays by the condenser lens 52 and the concave mirror 53. More specifically, the rays of light from the center 56 of a luminous element 55 in the lamp 51 are transmitted in parallel to the optical axis 57 by the condenser lens 52. From the light rays passed through the condenser lens 52 infrared rays are eliminated with the heat absorbing filter 54. The light rays from the light source 50 are transmitted to the component color separator 58 and separated into three primary color lights of red, green and blue. Red light passes through the light transmitter 59 and enters the red light valve 61. Green light is straightly transmitted to the green light valve 62. Similarly, blue light passes through the light transmitter 60 and enters the blue light valve 63. The light valves 61, 62 and 63 are liquid crystal panels each having matrix electrodes. The drive circuit 67 produces electric signals R, G and B according to a video signal Y to control the transmittance of pixels in respective light valves 61, 62 and 63. The modulated light outputs from the light valves 61, 62 and 63 are then combined into a composite flux of light substantially to reproduce a color picture at the position of the light valve 62. An enlarged image of the color picture is finally projected by the projection lens 65 on a screen 66.

The projection lens 65 is a telecentric lens arranged to allow all the chief rays on the light valve side to be in parallel to the optical axis 57. This is needed for the following reason. It is common that a light valve provides a variety of optical characteristics depending on the incident angle of light. As a projection lens is positioned far from the center of the light valve, the incident angle of chief ray to the light valve becomes great. This may cause a projected picture to vary in quality between the central and peripheral areas of the screen. To avoid such a disadvantageous effect, the telecentric lens is employed as a projection lens, thus allowing all the chief rays incident on the projection lens to be kept in parallel.

FIG. 2 shows an arrangement of the light transmitter 59 comprising an input side convergent lens 68, an input side plane mirror 69, a central convergent lens 70, an output side plane mirror 71, and an output side convergent lens 72 disposed in this order from the component color separator 58 side. Both the input side and output side convergent lenses 68, 72 are plano-convex lenses of the same shape and the same material having their respective planar surfaces 75 and 76 on the central convergent lens 70 side. The focal length of the plano-convex lens is two times that of the central convergent lens 70. The central convergent lens 70 is a bi-convex lens having on both ends convex surfaces 77 and 78 of the same radius of curvature. The input side and output side convergent lenses 68, 72 are positioned so that their respective focal points are adjacent to the center 79 of the central convergent lens 70. The input side and output side plane mirrors 69, 71 are provided between the input side convergent lens 68 and the central convergent lens 70 and between the central convergent lens 70 and the output side convergent lens 72 respectively each for bending the optical path at right angles. For keeping the spherical aberration to minimum and also, in respect of relatively low cost in plano-milling, the plano-convex lenses are employed as the output side convergent lens 68 and the input side convergent lens 72 and disposed with their respective planar surfaces 75 and 76 situated on the central convergent lens 70 side. The central convergent lens 70 is a bi-convex lens having at both sides the convex surfaces 77 and 78 equal in radius of curvature in order to keep its aberration to minimum. The light transmitter 60 for blue light is similar in optical arrangement to the light transmitter 59 for red light.

Figure 3:
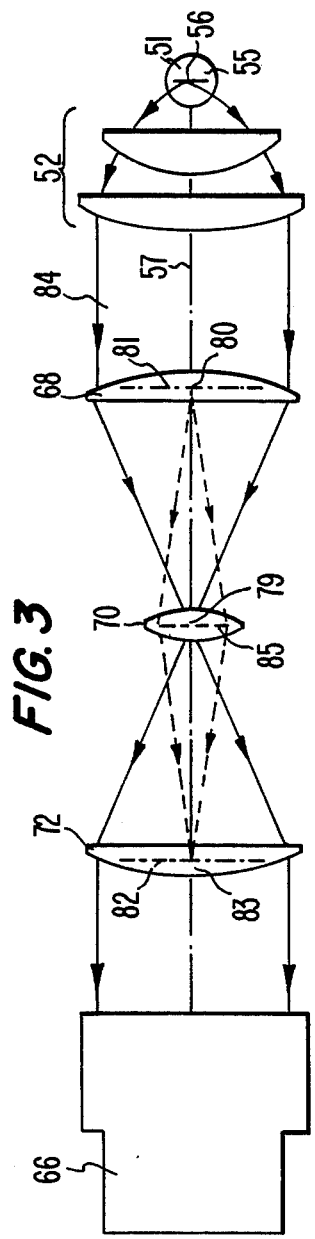
FIG. 3 is a schematic illustration explaining an optical operation in the light transmitter according to the present invention.

The optical operation in the light transmitter 59 of FIG. 2 will be described. FIG. 3 shows an optical system from the lamp 51 to the projection lens 66 in which only relative components are illustrated for ease of explanation.

The light transmitter 59 is characterized in the following aspects. Primarily, the real image 82 of an object 81 located adjacent to the center 80 of the input side convergent lens 68 is produced by the central convergent lens 70 at a location adjacent to the center 83 of the output side convergent lens 72 in reference to the relations in focal point and position between the convergent lenses 68, 70 and 72. The object 81 and the real image 82 are the same in size (1:1 magnification). Accordingly, every ray of light transmitted from the input side convergent lens 68 to the central convergent lens 70 in a given direction will reach the output side convergent lens 72. On the other hand, the light inputs to their respective light valves 61, 62 and 63 are approximately the same in luminous flux diameter.

Secondly, as both the focal points of the input side and output side convergent lenses 68, 72 are situated adjacent to the center 79 of the central convergent lens 70 which has no refracting power in the central area, a ray of light 84 transmitted through the peripheral area of the input side convergent lens 68 in parallel to the optical axis 57 can pass the center 79 of the central convergent lens 70 and the peripheral area of the output side convergent lens 72 and then, run forward in parallel to the optical axis 57. Accordingly, when the light from the center 56 of the luminous element 55 in the lamp 51 is refracted by the condenser lens 52 for parallel direction to the optical axis 57, a real image 85 of the luminous element 55 in the lamp 51 will be produced at the center 79 of the central convergent lens 70 by the condenser lens 52 and the input side convergent lens 68.

It is thus understood that when the effective area of the central convergent lens 70 is greater than the size of the real image 85 of the luminous element 55, all the light rays transmitted to the input side convergent lens 68 can pass across the output side convergent lens 72. More particularly, the loss of light in the light transmitter 59 which results from divergence of light is eliminated. Consequently, the efficiency of light in action is improved in respect to red and blue colors, as compared to the prior art apparatus of FIG. 11.

As shown in FIG. 3, both a light ray from the condenser lens 52 which is derived from the center 56 of the luminous element 55 in the lamp 51 and a light ray from the output side convergent lens 72 are parallel to the optical axis 57. Thus, primary color light rays of red, green and blue in the input side of the projection lens 66 are also parallel to the optical axis 57. Light rays from the light valves 61, 62 and 63 will then be transmitted effectively to the screen through the projection lens 66 of a telecentric lens. According to the arrangement of FIG. 2, the distance of the optical path between the input side and output side convergent lenses 68, 72 can desirably be determined, and thus a space for locating the plane mirrors 69 and 71 for bending the optical path will be assured.

The detailed explanation with actual values will be given.

Figure 11:
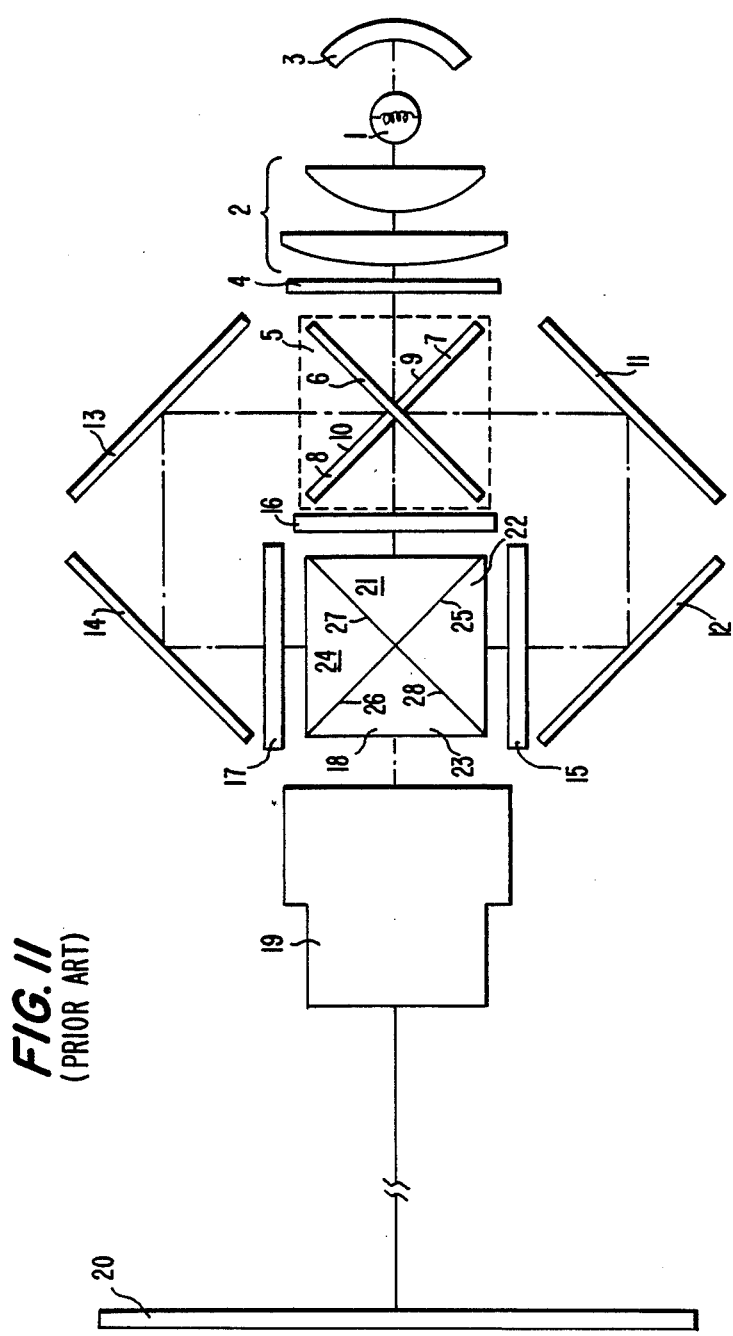
FIG. 11 is a schematic view showing the first arrangement of prior art projection display apparatus.

Assuming that each of the light valves 61, 62 and 63 be 40 mm×60 mm in size, focal length of the projection lens 66 be 150 mm, F-number of the same be F/2.5, focal length of the input side convergent lens 68 be 130 mm, focal length of the output side convergent lens 72 be 130 mm, and focal length of the central convergent lens 70 be 65 mm, the illuminance just before the red light valve 15 is about 50% of the illuminance just behind the component color separator 5 in the prior art arrangement of FIG. 11. In the first embodiment of the present invention shown in FIG. 1, the illuminance just before the red light valve 61 is about 75% of the illuminance just behind the component color separator 58. It is thus proved that the efficiency of light in action is improved. Similar effect on blue light can also be provided.

Figure 4:
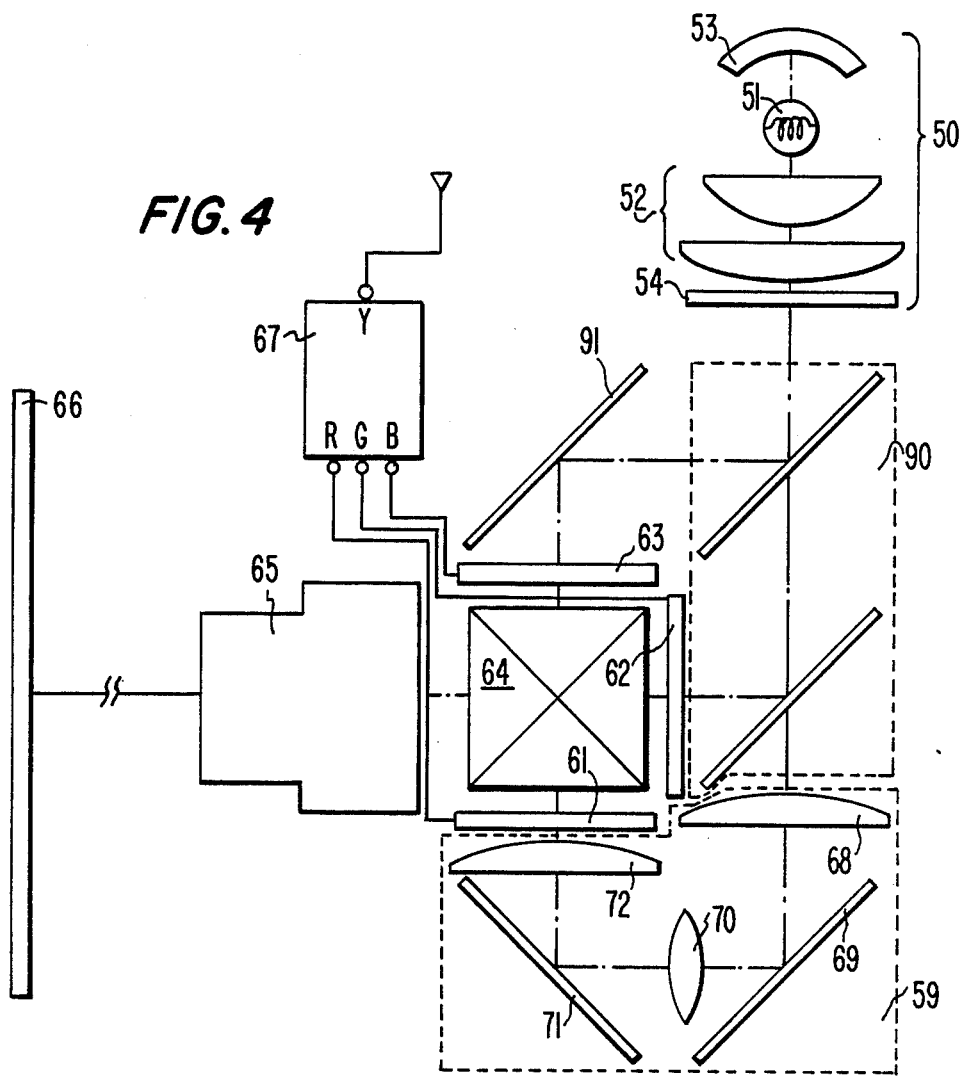
FIG. 4 is a schematic view showing an arrangement of a projection display apparatus according to a second embodiment of the present invention.

FIG. 4 shows an optical arrangement of a second embodiment of the present invention. The light source 50, light transmitter 59, light valves 61, 62 and 63, light combiner 64, projection lens 65, screen 66, and drive circuit 67 are the same as those of the first embodiment of the present invention shown in FIG. 1.

Light from the light source 50 is transmitted to the component color separator 90 and separated into three primary color lights of red, green and blue. Blue light is reflected at a right angle by a plane mirror 91 and enters the blue light valve 63. Green light is straightly transmitted to the green light valve 62. Red light passes the light transmitter 59 and enters the red light valve 61. In this respect, the optical operation in the light transmitter 59 is the same as in the first embodiment. The modulated lights from the light valves 61, 62 and 63 are then recombined by the light combiner 64 into a composite luminous flux which is in turn projected by the projection lens 65 onto the screen 66.

Figure 12:
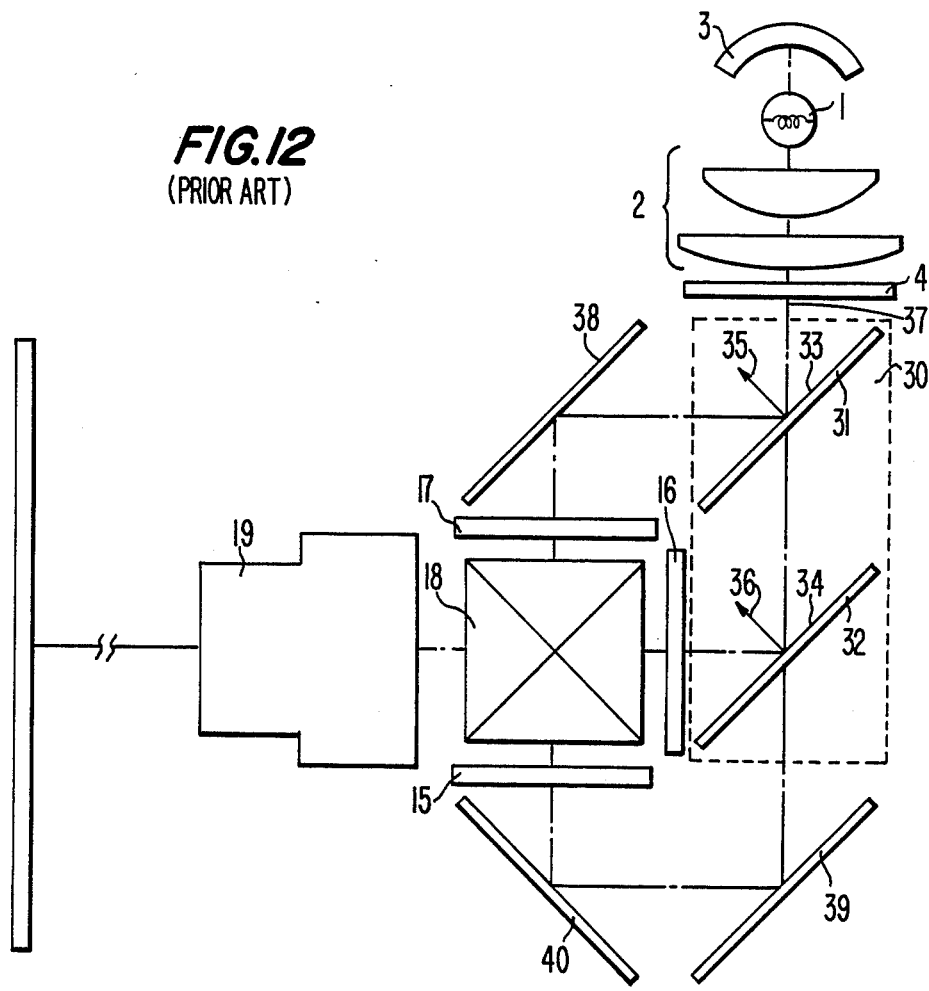
FIG. 12 is a schematic view showing the second arrangement of the prior art projection display apparatus.

In the prior art arrangement of FIG. 12, the illuminance just before the red light valve 15 is about 50% of the illuminance just behind the component color separator 30. In the second embodiment of the present invention shown in FIG. 4, the illuminance just before the red light valve 61 is about 75% of the illuminance just behind the component color separator 90. It is also proved that the efficiency of light in action is improved.

Figure 5:
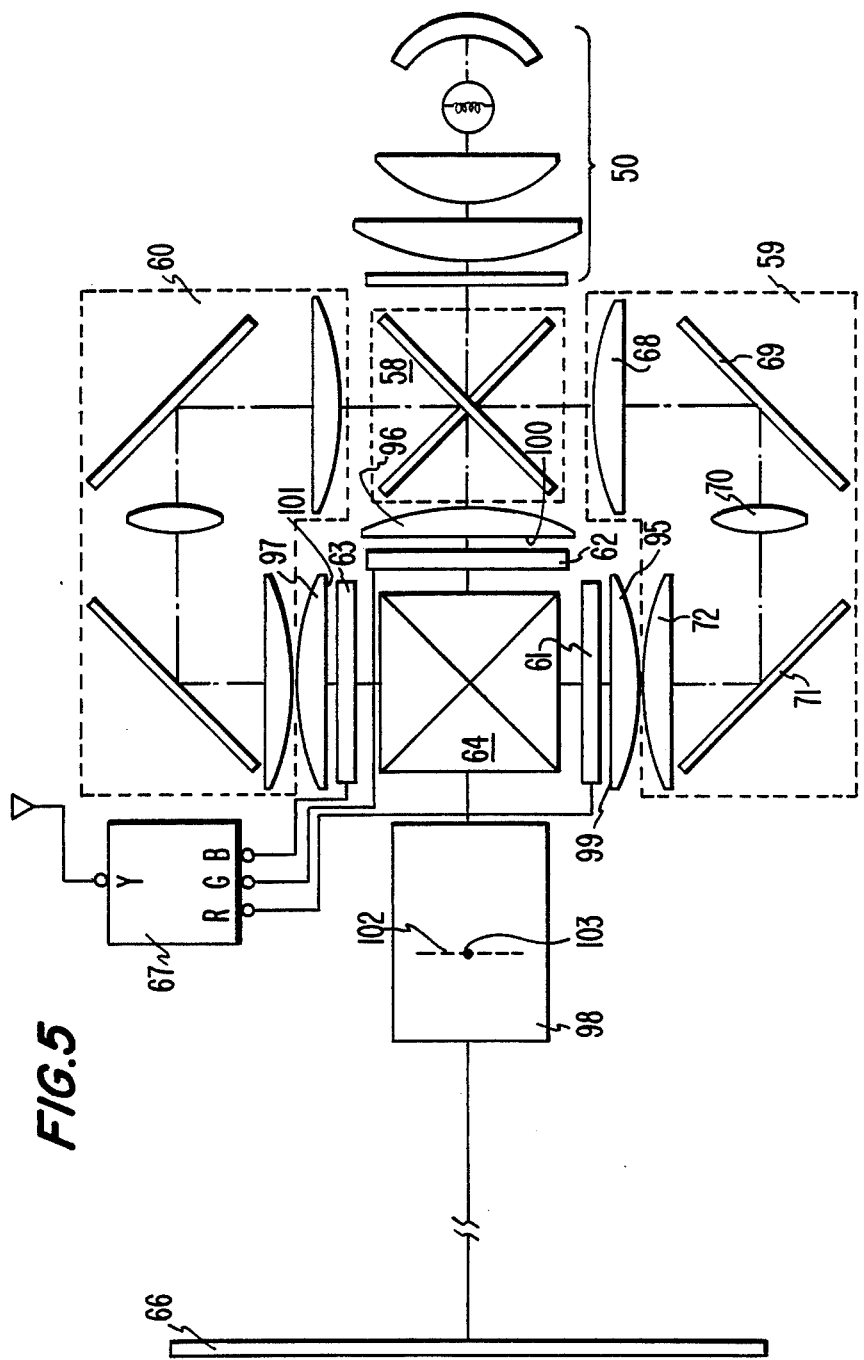
FIG. 5 is a schematic view showing an arrangement of a projection display apparatus according to a third embodiment of the present invention.
Figure 6:
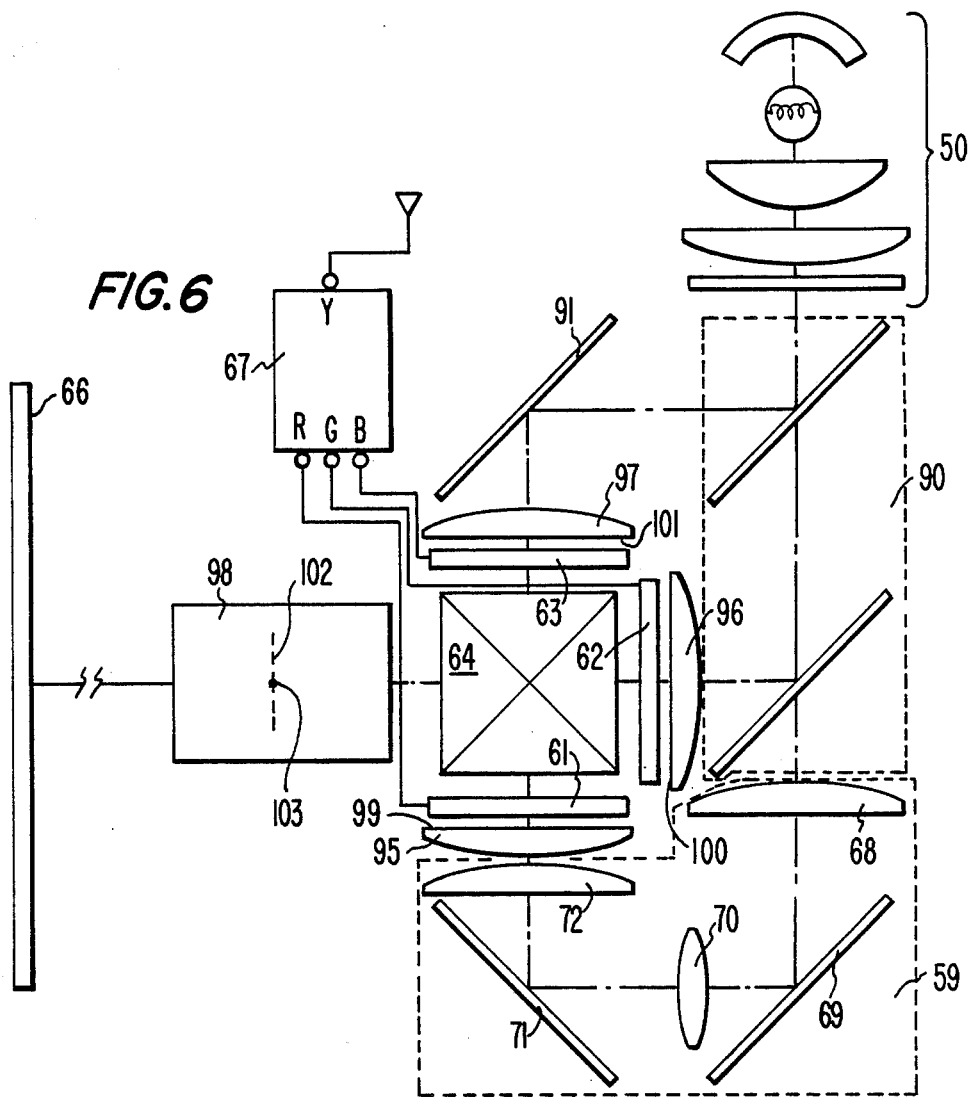
FIG. 6 is a schematic view showing an arrangement of a projection display apparatus according to a fourth embodiment of the present invention.

FIGS. 5 and 6 show optical arrangements respectively according to third and fourth embodiments of the present invention. Each of the arrangements, similar to that of the first or second embodiment, includes field lenses 95, 96 and 97 disposed in front of their respective light valves 61, 62 and 63, and also a projection lens 98 which is not a telecentric lens as replacing the telecentric projection lens 65.

The field lenses 95, 96 and 97 are plano-convex lenses arranged for directing lights from the peripheral areas of the light valves 61, 62 and 63 to the projection lens 98 and having their respective planar surfaces 99, 100 and 101 facing the light valves 61, 62 and 63 respectively so that their focal points can be adjacent to the center 103 of an entrance pupil 102 in the projection lens 98. The field lens is shaped in such a shape and also arranged in such a direction as to keep the spherical aberration to minimum and consider the relatively low cost in planomilling. The projection lens 98 has a small field angle on the side of the light valves 61, 62, 63 so that variations of the optical characteristics to different incident angles of light to the light valves 61, 62 and 63 can be minimized.

It is thus understood that each of the third and fourth embodiments of the present invention provides an improvement in the efficiency of light with its light transmitter employed in the same fashion as the first or second embodiment.

The light transmitter 59 or 60 in each of the first, second, third and fourth embodiments may have another arrangement. The input side and output side convergent lenses 68, 72 in the light transmitter 59 shown in FIG. 2 need not be plano-convex lenses. As shown in FIG. 7, the light transmitter 59 may include input side and output side convergent lenses 105, 106 which are bi-convex lenses of the same shape and the same material having their respective small curvature surfaces 107 and 108 facing the central convergent lens 70. Generally, a spherical lens becomes great in spherical aberration when its F-number is small and the diffusion of light will not be neglected. Accordingly, a bi-convex lens provided on the side of the central convergent lens 70 with one surface thereof having a radius of curvature about two times that of the opposite surface thereof, provides less spherical aberration than a plano-convex lens. In respect to cost in mass production, the input side and output side convergent lenses 105 and 106 may be the same in shape and material.

Figure 8:
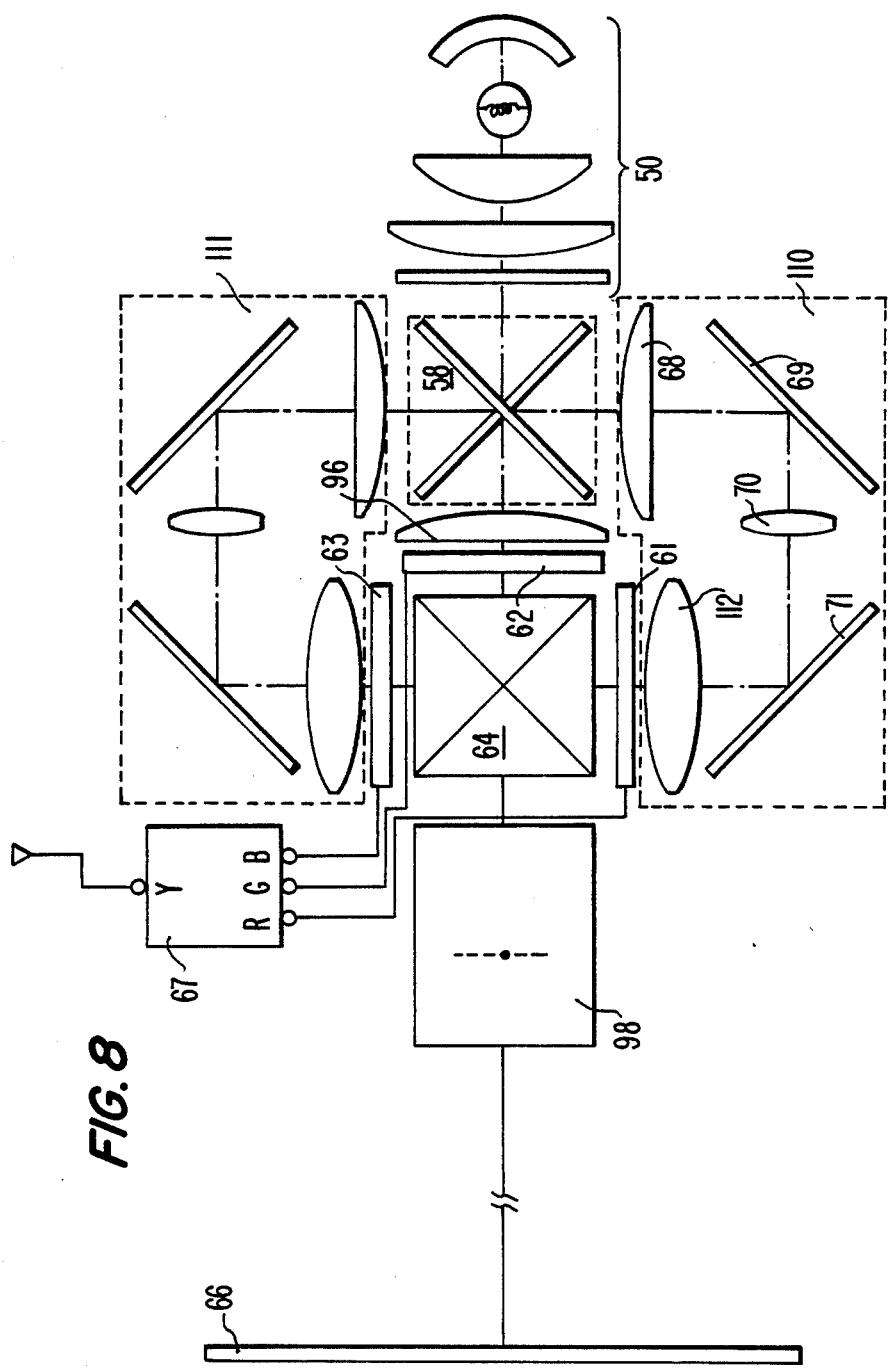
FIG. 8 is a schematic view showing an arrangement of a projection display apparatus according to a fifth embodiment of the present invention.
Figure 9:
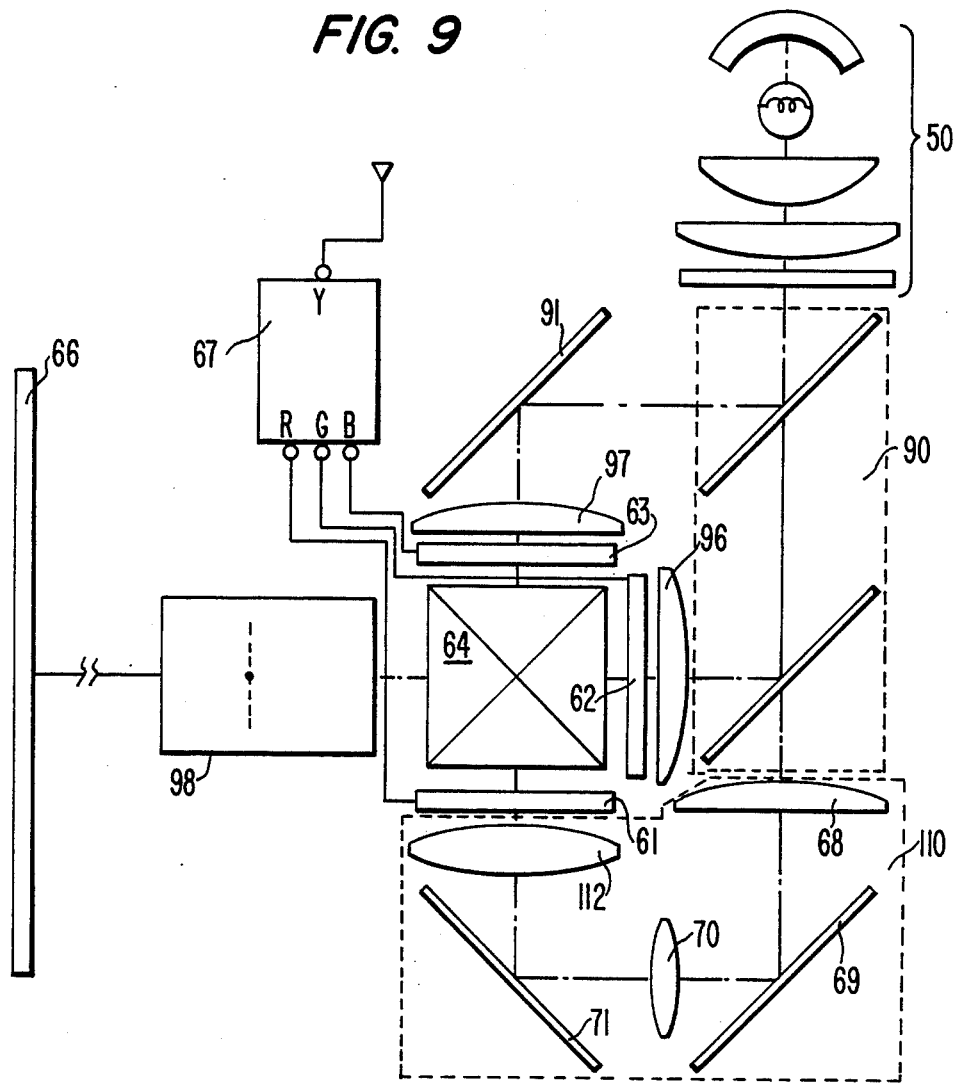
FIG. 9 is a schematic view showing an arrangement of a projection display apparatus according to a sixth embodiment of the present invention.

FIGS. 8 and 9 show optical arrangements of a fifth and a sixth embodiment of the present invention respectively, in which both the output side convergent lens 72 in the light transmitter 59 and the field lens 95 of the third or fourth embodiment is replaced with one convergent lens. More particularly, an output side convergent lens 112 in a light transmitter 110 acts as a combination of the output side convergent lens 72 and the field lens 95 in the third or fourth embodiment. A light transmitter 111 is arranged in a similar manner. With the exception of the above arrangements, the third and fourth embodiments are the same as the fifth and sixth embodiments respectively. In comparison of the fifth and sixth embodiments with the third and fourth embodiments respectively, the number of lenses can be minimized and the cost of the entire system can be reduced.

It is then proved that the efficiency of light in action can be improved with the light transmitters in both the fifth and sixth embodiments with the same effects as in the first and second embodiments.

In reference to the light transmitter 59 or 110 of the second, fourth and sixth embodiments, at least either the input side plane mirror 69 or the output side plane mirror 71 may be a flat-plate type red reflecting dichroic mirror. As the spectral reflectance of the red reflecting dichroic mirror is desiredly determined, red light of high purity can be obtained as compared to the use of a plane mirror. Consequently, a composite color image of the picture produced by the light combiner 64 will be improved in reproduction of color.

Figure 10:
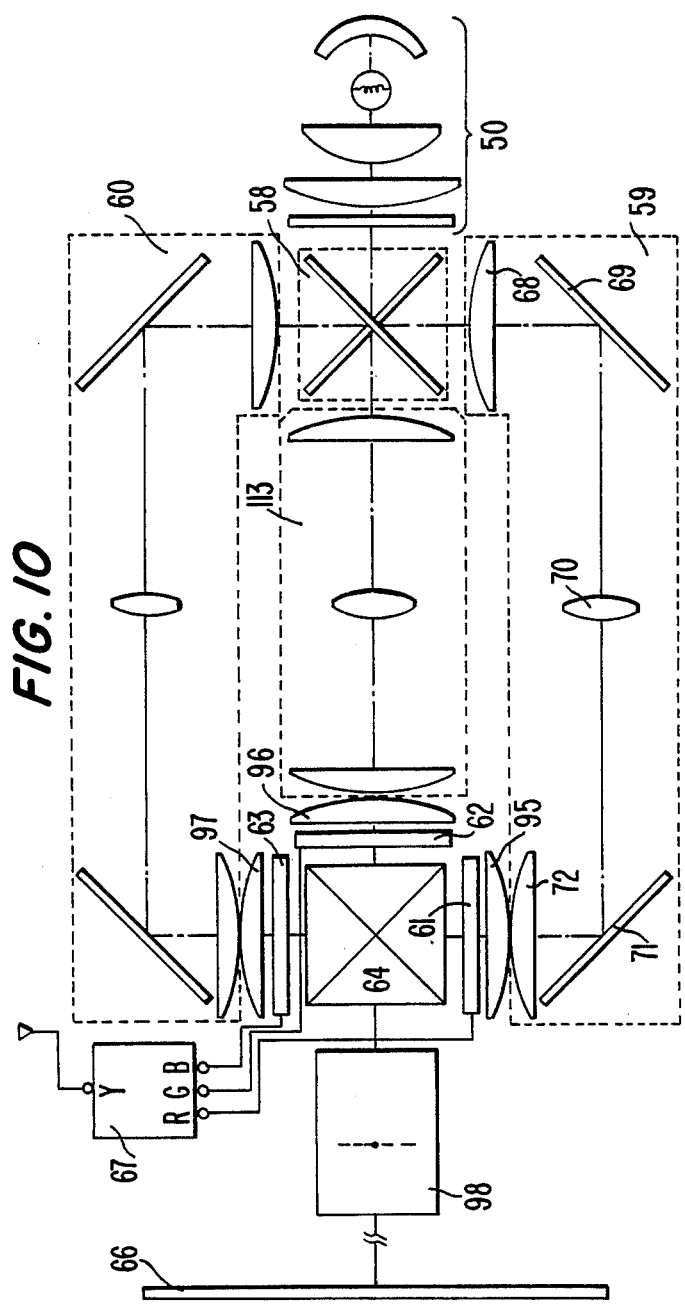
FIG. 10 is a schematic view showing an arrangement of a projection display apparatus according to a seventh embodiment of the present invention.

FIG. 10 shows a seventh embodiment of the present invention in the form of a projection display apparatus. This embodiment includes a light transmitter 113 disposed across the optical path of green light in the third embodiment. Thus, the distances of their respective optical paths of red, green, and blue light rays between the component color separator 58 and their respective light valves 61, 62 and 63 can be determined by appropriately setting the focal lengths of the convergent lenses in the light transmitters 59, 60 and 113 respectively. The adjustment is advantageous when the optical paths of light rays between the component color separator 58 and their respective light valves 61, 62 and 63 are elongated. When a proper number of plane mirrors are disposed between the convergent lenses in each of the light transmitters 59, 60 and 113, the arrangement of optical components throughout a color separator system is facilitated as having a widely extending space. As a result, the projection display apparatus will have more variety in its arrangement and form.

When at least a lens has at least an aspherical surface for restriction on the generation of optical aberration in the light transmitter of any of the embodiments, the loss of light energy due to the diffusion of light in the light transmitter can be minimized. Although the light transmitter of FIG. 2 or 7 is restricted in arrangement in which the shape of each convergent lens is predetermined and the positional or focal relation between the three convergent lenses is defined, modifications and variations will be possible for optimum ratios of the illuminance between the central and peripheral areas of the screen or between three primary colors of red, green and blue.

Although the third, fourth, fifth and sixth embodiments employ plano-convex lenses as the field lenses 95, 96 and 97, spherical lenses of various shapes or lenses having at one side an aspherical surface can also provide an optimum ratio of illuminance in the peripheral area of a screen to that in the central area. It is preferred in respect of optical aberration to have the small curvature end of a lens to the light valve side. When the field lenses 95, 96 and 97 are of the same shape and material as at least one or both of the input side and output side convergent lenses 68, 72, the cost for mass production can be reduced.

Although the light valves 61, 62 and 63 in each of the embodiments are liquid crystal panels, they may be of any type, e.g. of electro-optical crystal, capable of producing an optical image corresponding to a video signal as a change in the optical characteristics and also, modulating a light passed therethrough. As described, the light combiner 64 is a prism type dichroic mirror. However, if a high resolution is unnecessary, a combination of planar dichroic mirrors will be employed in the same X-shaped arrangement as the component color separator 58. Such modifications can provide the same effects as in the embodiments.

What is claimed is:

1. A projection display apparatus comprising:
   a light source for generating a light containing three primary color lights;
   component color separating means for separating the light from the light source into the three primary color lights;
   three light valves having formed therein optical images for respectively modulating the three primary color lights from the component color separating means;
   driving means for driving the three light valves according to a video signal to form the optical images;
   light combining means for combining modulated lights from the three light valves into a composite luminous flux;
   projection means for projecting the composite luminous flux onto a screen upon to produce thereon an enlargement of the optical images; and
   light transmitting means disposed on an optical path where a distance from the component color separator means to a corresponding light valve is at least two times a width of an effective light flux incident on the corresponding light valve for directing a light from the component color separator means to the corresponding light valve,
   wherein said light transmitting means comprises:

an input side convergent lens disposed at an input end;

an output side convergent lens disposed at an output end; and a central convergent lens disposed on an optical path between the input side and output side convergent lenses so that a real image of a luminous element in the light source is formed by the input side convergent lens at a position adjacent to the central convergent lens while a real image of an object positioned about the input side convergent lens is formed by the central convergent lens at a location adjacent to the output side convergent lens, said output side convergent lens permitting its output light to reach the projecting means.

2. A projection display apparatus as defined in claim 1, wherein each of said input side and output side convergent lenses has a focal length approximately two times a focal length of the central convergent lens and is arranged so that its focal point is positioned about the center of the central convergent lens.

3. A projection display apparatus as defined in claim 1, wherein said central convergent lens is a bi-convex lens having both surfaces of equal radius of curvature.

4. A projection display apparatus as defined in claim 1, wherein said input side and output side convergent lenses are the same in shape and material.

5. A projection display apparatus as defined in claim 1, wherein each of said input side and output side convergent lenses is arranged with its surface of a smaller curvature facing the central convergent lens.

6. A projection display apparatus as defined in claim 1, wherein both said input side and output side convergent lenses are plano-convex lenses of the same shape and material arranged with their respective planar surfaces facing the central convergent lens.

7. A projection display apparatus as defined in claim 1, wherein at least one of said input side, central, and output side convergent lenses has at least one aspherical surface.

8. A projection display apparatus as defined in claim 1, wherein said projection means is a telecentric lens while light rays from both the light source and the light transmitting means are approximately parallel rays.

9. A projection display apparatus comprising:

a light source for generating a light containing three primary color lights;

component color separating means provided with a couple of dichroic mirror surfaces intersecting each other in X-shaped arrangement for separating the light from the light source into the three primary color lights;

three light valves having formed therein optical images for respectively modulating the three primary color lights;

driving means for driving the three light valves according to a video signal to form the optical images;

a couple of light transmitting means for directing two of the three color lights from the component color separating means to corresponding two light valves;

light combining means provided with a couple of dichoric mirror surfaces arranged in an X shape for combining modulated light outputs from their respective light valves into a composite luminous flux; and projection means for projecting the composite luminous flux onto a screen to produce thereon an enlargement of the optical images, wherein each of said two light transmitting means comprises:

an input side convergent lens disposed at an input end;

an output side convergent lens disposed at an output end;

a central convergent lens disposed on an optical path between the input side and output side convergent lenses;

an input side plane mirror for bending an optical path between the input side and central convergent lenses; and an output side plane mirror for bending an optical path between the central and output side convergent lenses, wherein a real image of a luminous element in the light source is formed by the input side convergent lens at a position adjacent to the central convergent lens while a real image of an object situated about a position of the input side convergent lens is formed by the central convergent lens at a location adjacent to the output side convergent lens which permits its output light to reach the projection means.

10. A projection display apparatus as defined in claim 9, wherein each of said input side and output side convergent lenses has a focal length approximately two times a focal length of the central convergent lens and is arranged so that its focal point is situated about the center of the central convergent lens.

11. A projection display apparatus as defined in claim 9, wherein said central convergent lens is a bi-convex lens having both surfaces of equal radius of curvature.

12. A projection display apparatus as defined in claim 9, wherein said input side and output side convergent lenses are the same in shape and material.

13. A projection display apparatus as defined in claim 9, wherein each of said input side and output side convergent lenses is arranged with its surface of a smaller curvature facing the central convergent lens.

14. A projection display apparatus as defined in claim 9, wherein both said input side and output side convergent lenses are plano-convex lenses of the same shape and material arranged with their respective planar surfaces facing the central convergent lens.

15. A projection display apparatus as defined in claim 9, wherein at least one of said input side, central, and output side convergent lenses has at least one aspherical surface.

16. A projection display apparatus as defined in claim 9, wherein said projection means is a telecentric lens while light rays from both the light source and the light transmitting means are approximately parallel rays.

17. A projection display apparatus comprising:

a light source for generating a light containing three primary color lights;

component color separating means provided with a couple of dichroic mirror surfaces intersecting each other in X-shaped arrangement for separating the light from the light source into the three primary color lights;

three field lenses for receiving the three primary color lights from the-component color separating means;

three light valves having formed therein optical images for respectively modulating the three primary color lights transmitted through the respective field lenses;

driving means for driving the three light valves according to a video signal to form the optical images;

a couple of light transmitting means for directing two of the three primary color lights from the component color separating means to two corresponding light valves;

light combiner means provided with a couple of dichroic mirror surfaces arranged in an X shape for combining light outputs from the three light valves into a composite luminous flux; and projection mean for projecting the composite luminous flux onto a screen to produce thereon an enlargement of the optical images, wherein each of said two light transmitting means comprises:

an input side convergent lens disposed at an input end;

an output side convergent lens disposed at an output end;

a central convergent lens disposed on an optical path between the input side and output side convergent lenses;

an input side plane mirror for bending an optical path between the input side and central convergent lenses; and an output side plane mirror for bending an optical path between the central and output side convergent lenses, wherein a real image of a luminous element in the light source is formed by the input side convergent lens at a position adjacent to the central convergent lens while a real image of an object situated about a position of the input side convergent lens is formed by the central convergent lens at a location adjacent to the output side convergent lens which permits its output light to reach the projection means via a corresponding field lens.

18. A projection display apparatus as defined in claim 17, wherein each of said input side and output side convergent lenses has a focal length approximately two times a focal length of the central convergent lens and is arranged so that its focal point is situated about the center of the central convergent lens.

19. A projection display apparatus as defined in claim 17, wherein said central convergent lens is a bi-convex lens having both surfaces of equal radius of curvature.

20. A projection display apparatus as defined in claim 17, wherein at least two of said field, input side convergent, and output side convergent lenses are the same in shape and material.

21. A projection display apparatus as defined in claim 17, wherein each of said input side and output side convergent lenses is arranged with its surface of a smaller curvature facing the central convergent lens.

22. A projection display apparatus as defined in claim 17, wherein both said input side and output side convergent lenses are plano-convex lenses of the same shape and material situated with their respective planar surfaces facing the central convergent lens.

23. A projection display apparatus as defined in claim 17, wherein at least one of said field, input side convergent, central convergent, and output side convergent lenses has at least one aspherical surface.

24. A projection display apparatus as defined in claim 17, wherein light rays from both said light source and light transmitting means are approximately parallel rays.

25. A projection display apparatus as defined in claim 17, wherein each of said field lenses is arranged with its surface of a smaller curvature facing a corresponding light valve.

26. A projection display apparatus as defined in claim 17, wherein each of said field lenses is a plano-convex lens situated with its planar surface facing a corresponding light valve.

27. A projection display apparatus comprising:

a light source for generating a light containing three primary color lights;

component color separating means provided with a couple of dichroic mirror surfaces intersecting each other in X-shaped arrangement for separating the light from the light source into the three primary color lights;

three light valves having formed therein optical images for respectively modulating the three primary color lights from the component color separating means;

driving means for driving the three light valves according to a video signal to form the optical images;

a field lens for receiving a straightly directing one of the lights from the component color separating means and transmitting it to a corresponding light valve;

a couple of light transmitting means for directing other two of the lights from the component color separating means to two corresponding light valves;

light combining means provided with a couple of dichoric mirror surfaces arranged in an X shape for combining modulated light outputs from the three light valves into a composite luminous flux; and projection means for projecting the composite luminous flux onto a screen upon to produce thereon an enlargement of the optical images, wherein each of said two light transmitting means comprises:

an input side convergent lens disposed at an input end;

an output side convergent lens disposed at an output end;

a central convergent lens disposed on an optical path between the input side and output side convergent lenses;

an input side plane mirror for bending an optical path between the input side and central convergent lenses; and an output side plane mirror for bending an optical path between the central and output side convergent lenses, wherein a real image of a luminous element in the light source is formed by the input side convergent lens at a position adjacent to the central convergent lens while a real image of an object situated about a position of the input side convergent lens is formed by the central convergent lens at a location adjacent to the output side convergent lens which permits its output light to reach the projection means.

28. A projection display apparatus as defined in claim 27, wherein said input side, central, and output side convergent lenses are arranged at approximately optically equal distances while said input side convergent lens has a focal length approximately two times a focal length of the central convergent lens and is arranged so that its focal point is situated about the center of the central convergent lens.

29. A projection display apparatus as defined in claim 27, wherein said central convergent lens is a bi-convex lens having both surfaces of equal radius of curvature.

30. A projection display apparatus as defined in claim 27, wherein said input side convergent lens is arranged with its surface of a smaller curvature facing the central convergent lens.

31. A projection display apparatus as defined in claim 27, wherein said input side convergent lens is a plano-convex lens arranged with its planar surface facing the central convergent lens.

32. A projection display apparatus as defined in claim 27, wherein at least one of said field, input side convergent, central convergent, and out side convergent lenses has at least one aspherical surface.

33. A projection display as defined in claim 27, wherein the light from said source is incident in approximately parallel relationship.

34. A projection display apparatus as defined in claim 27, wherein said field lens is arranged with its surface of a smaller curvature facing a corresponding light valve.

35. A projection display apparatus as defined in claim 27, wherein said field lens is a plano-convex lens with its planar surface facing a corresponding light valve.

36. A projection display apparatus as defined in claim 27, wherein said output side convergent lens is a bi-convex lens.

37. A projection display apparatus comprising:
a light source for generating a light containing three primary color lights;
component color separating means provided with a first dichroic mirror surface for separating the light from the light source into a first primary color light and a light containing second and third primary color lights and a second dichroic mirror surface arranged in parallel with the first dichroic mirror surface for separating the light containing the second and third primary color lights transmitted through the first dichroic mirror surface into the second and third primary color lights thereby to obtain the three primary color lights separated from one another;
three light valves having formed therein optical images for respectively modulating the three primary color lights from the component color separating means;
driving means for driving the three light valves according to a video signal to obtain the optical images;
a plane mirror for directing the first primary color light from the first dichroic mirror surface to a corresponding light valve;
light transmitting means for directing the third primary color light from the second dichroic mirror surface to a corresponding light valve;
light combining means provided with a couple of dichroic mirror surfaces arranged in an X shape for combining light outputs from the three light valves into a composite luminous flux; and
projection means for projecting the composite luminous flux onto a screen to produce thereon an enlargement of the optical images,
wherein said light transmitting means comprises:
an input side convergent lens disposed at an input end;
an output side convergent lens disposed at an output end;
a central convergent lens disposed on an optical path between the input side and output side convergent lenses;
an input side plane mirror for bending an optical path between the input side and central convergent lenses; and
an output side plane mirror for bending an optical path between the central and output side convergent lenses, wherein a real image of a luminous element in the light source is formed by the input side convergent lens at a position adjacent to the central convergent lens while a real image of an object situated about a position of the input side convergent lens is formed y the central convergent lens at a location adjacent to the output side convergent lens which permits its output light to reach the projection means.

38. A projection display apparatus as defined in claim 37, wherein each of said input side and output side convergent lenses has a focal length approximately two times a focal length of the central convergent lens an- is arranged so that its focal point is situated about the center of the central convergent lens.

39. A projection display apparatus as defined in claim 37, wherein said central convergent lens s a bi-convex lens having both surfaces of equal radius of curvature.

40. A projection display apparatus as defined in claim 37, wherein said input side and output side convergent lenses are the same in shape and material.

41. A projection display apparatus as defined in claim 37, wherein each of said input side and output side convergent lenses is arranged with its surface of a smaller curvature facing the central convergent lens.

42. A projection display apparatus as defined in claim 37, wherein both said input side and output side convergent lenses are plano-convex lenses of the same shape and material arranged with their respective planar surfaces facing the central convergent lens.

43. A projection display apparatus as defined in claim 37, wherein at least one of said input side, central, and output side convergent lenses has at least one aspherical surface.

44. A projection display apparatus as defined in claim 37, wherein said projection means is a telecentric lens while light rays from both the light source and the light transmitting means are approximately parallel rays.

45. A projection display apparatus as defined in claim 37, wherein at least one of said plane mirrors for bending the optical path in the light transmitting means is a flat-plate type dichroic mirror.

46. A projection display apparatus comprising:
a light source for generating a light containing three primary color lights;
component color separating means provided with a first dichroic mirror surface for separating the light from the light source into a first primary color light and a light containing second and third primary color lights and a second dichroic mirror surface in parallel with the first dichroic mirror surface for separating the light containing the second and third primary color lights transmitted through the first dichroic mirror surface into the second and third primary color lights thereby to obtain the three primary color lights separated from one another;

three field lenses for receiving the three primary color lights from the component color separating means;

three light valves having formed therein optical images for respectively modulating the three primary color lights transmitted through the three field lenses;

driving means for driving the three light valves according to picture signals a video signal to form the optical images;

a plane mirror for directing the first primary color light from the first dichroic mirror surface to a corresponding light valve;

light transmitting mean for directing the third primary color light transmitted through the second dichroic mirror surface to a corresponding light valve;

light combining means provided with a couple of dichroic mirror surfaces arranged in an X shape for combining modulated light outputs from the three light valves into a composite luminous flux; and projection means for projecting the composite luminous flux onto a screen to produce thereon an enlargement of the optical images, each of said field lenses directing a received light to the projection means, wherein said light transmitting means comprises:

an input side convergent lens disposed at an input end;

an output side convergent lens disposed at an output end;

a central convergent lens disposed on an optical path between the input side and output side convergent lenses;

an input side plane mirror for bending an optical path between the input side and central convergent lenses; and an output side plane mirror for bending an optical path between the central and output side convergent lenses, wherein a real image of a luminous element in the light source is formed by the input side convergent lens at a position adjacent to the central convergent lens while a real image of an object situated about a position of the input side convergent lens is formed by the central convergent lens at a location adjacent to the output side convergent lens which permits its output light to reach the projection means via the field lens.

47. A projection display apparatus as defined in claim 46, wherein each of said input side and output side convergent lenses has a focal length approximately two times a focal length of the central convergent lens and is arranged so that its focal point is situated about the center of the central convergent lens.

48. A projection display apparatus as defined in claim 46, wherein said central convergent lens is a bi-convex lens having both surfaces of equal radius of curvature.

49. A projection display apparatus as defined in claim 46, wherein at least any two of said field, input side convergent, and output side convergent lenses are the same in shape and material.

50. A projection display apparatus as defined in claim 46, wherein each of said input side and output side convergent lenses is arranged with its surface of a smaller curvature facing the central convergent lens.

51. A projection display apparatus as defined in claim 46, wherein both said input side and output side convergent lenses are plano-convex lenses of the same shape and material with their respective planar surfaces facing the central convergent lens.

52. A projection display apparatus as defined in claim 46, wherein at least one of said field, input side convergent, central convergent, and output side convergent lenses has at least one aspherical surface.

53. A projection display apparatus as defined in claim 46, wherein light rays from said light source and said light transmitter means are approximately parallel rays.

54. A projection display apparatus as defined in claim 46, wherein said field lens is arranged with its surface of a smaller curvature facing a corresponding light valve.

55. A projection display apparatus as defined in claim 46, wherein said field lens is a plano-convex lens with its planar surface facing a corresponding light valve.

56. A projection display apparatus as defined in claim 46, wherein at least one of said plane mirrors for bending the optical path in the light transmitting means is a flat-plate type dichroic mirror.

57. A projection display apparatus comprising:

a light source for generating a light containing three primary color lights;

component color separating means provided with a first dichroic mirror surface for separating the light from the light source into a first primary color light and a light containing second and third primary color lights and a second dichroic mirror surface in parallel with the first dichroic mirror surface for separating the light containing the second and third primary color lights transmitted through the first dichroic mirror surface into the second and third primary color lights thereby to obtain the three primary color lights separated from one another;

three light valves having formed therein optical images for respectively modulating the three primary color lights from the component color separating means;

driving means for driving the three light valves according to a video signal to form the optical images;

a couple of field lenses for transmitting the first primary color light from the first dichroic mirror surface and the second primary color light from the second dichroic mirror surface respectively to two corresponding light valves;

a plane mirror for directing the first primary color light to one of the two field lenses;

light transmitting means for directing the third primary color light from the second dichroic mirror surface to a corresponding light valve;

light combining means provided with a couple of dichroic mirror surfaces arranged in an X shape for combining modulated light outputs from the thee light valves into a composite luminous flux; and projection means for projecting the composite luminous flux onto a screen to produce thereon an enlargement of the optical images, each of said two field lenses directing a received light to the projection means which receives the second primary color light from the light combining means;

wherein said light transmitting means comprises:

an input side convergent lens disposed at an input end;

an output side convergent lens disposed at an output end;

a central convergent lens disposed on an optical path between the input side and output side convergent lenses;

an input side plane mirror for bending an optical path between the input side and central convergent lenses; and an output side plane mirror for bending an optical path between the central and output side convergent lenses, wherein a real image of a luminous element in the light source is formed by the input side convergent lens at a position adjacent to the central convergent lens while a real image of an object situated about a position of the input side convergent lens is formed by the central convergent lens at a location adjacent to the output side convergent lens which permits its output light to reach the projection means.

58. A projection display apparatus as defined in claim 57, wherein said input side, central, and output side convergent lenses are arranged at approximately optically equal distances while said input side convergent lens has a focal length approximately two times a focal length of the central convergent lens and is arranged so that its focal point is situated about the center of the central convergent lens.

59. A projection display apparatus as defined in claim 57, wherein said central convergent lens is a bi-convex lens having both surfaces of equal radius of curvature.

60. A projection display apparatus as defined in claim 57, wherein said input side convergent lens is a lens with its surface of a smaller curvature facing the central convergent lens.

61. A projection display apparatus as defined in claim 57, wherein said input side convergent lens is a plano-convex lens with its planar surface facing the central convergent lens.

62. A projection display apparatus as defined in claim 57, wherein at least one of said field, input side convergent, central convergent, and output side convergent lens has at least one aspherical surface.

63. A projection display apparatus as defined in claim 57, wherein the light from said light source is in approximately parallel relationship.

64. A projection display apparatus as defined in claim 57, wherein said field lens is arranged with its surface of a smaller curvature facing a corresponding light valve.

65. A projection display apparatus as defined in claim 57, wherein said field lens is a plano-convex lens with its planar surface facing a corresponding light valve.

66. A projection display apparatus as defined in claim 57, wherein said output side convergent lens is a bi-convex lens.

67. A projection display apparatus as defined in claim 57, wherein at least one of said plane mirrors for bending the optical path in the light transmitting means is a flat-plate type dichroic mirror.

* * * * *